United States Patent
Kumar et al.

(10) Patent No.: US 11,868,275 B2
(45) Date of Patent: Jan. 9, 2024

(54) ENCRYPTED DATA PROCESSING DESIGN INCLUDING LOCAL BUFFERS

(71) Applicant: International Business Machines Corporation, Armonk, NY (US)

(72) Inventors: Manoj Kumar, Yorktown Heights, NY (US); Gianfranco Bilardi, Padua (IT); Kattamuri Ekanadham, Mohegan Lake, NY (US); Jose E. Moreira, Irvington, NY (US); Pratap C. Pattnaik, Yorktown Heights, NY (US); Jessica Hui-Chun Tseng, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 17/356,752

(22) Filed: Jun. 24, 2021

(65) Prior Publication Data

US 2022/0414023 A1    Dec. 29, 2022

(51) Int. Cl.
*H04L 9/06* (2006.01)
*H04L 9/08* (2006.01)
*G06F 12/14* (2006.01)

(52) U.S. Cl.
CPC ........ *G06F 12/1408* (2013.01); *H04L 9/0618* (2013.01); *G06F 2212/1052* (2013.01)

(58) Field of Classification Search
CPC ......... G06F 12/1408; G06F 2212/1052; H04L 9/0618

(Continued)

(56) References Cited

U.S. PATENT DOCUMENTS

| 4,941,176 A | | 7/1990 | Matyas |
| 5,295,188 A | * | 3/1994 | Wilson .................... H04L 9/302 |
| | | | 713/180 |

(Continued)

FOREIGN PATENT DOCUMENTS

EP    1082722 B1    3/2001

OTHER PUBLICATIONS

Zhaohui Wang; Implementing and Optimizing an Encryption Filesystem on Android; 2012 IEEE; pp. 52-62.*

(Continued)

*Primary Examiner* — Monjur Rahim
(74) *Attorney, Agent, or Firm* — James L. Olsen

(57) ABSTRACT

Aspects of the present disclosure relate to encrypted data processing (EDAP). A processor includes a register file configured to store ciphertext data, an instruction fetch and decode unit configured to fetch and decode instructions, and a functional unit configured to process the stored ciphertext data. The functional unit further includes a decryption module configured to decrypt ciphertext data from the register file to receive cleartext data using an encryption key stored within the functional unit. The functional unit further includes a local buffer configured to store the cleartext data. The functional unit further includes an arithmetic logical unit configured to generate cleartext computation results using the cleartext data The functional unit further includes an encryption module configured to encrypt the cleartext computation results to generate ciphertext computation results for storage back into the register file.

19 Claims, 7 Drawing Sheets

(58) Field of Classification Search
USPC .......................................................... 713/193
See application file for complete search history.

(56) References Cited

U.S. PATENT DOCUMENTS

| | | | |
|---|---|---|---|
| 5,799,088 A * | 8/1998 | Raike | H04L 9/3093 380/46 |
| 6,920,562 B1 * | 7/2005 | Kerr | G06F 21/72 712/18 |
| 7,885,405 B1 * | 2/2011 | Bong | H04L 9/0637 713/153 |
| 8,356,185 B2 | 1/2013 | Olson et al. | |
| 8,417,961 B2 | 4/2013 | Olson et al. | |
| 8,654,970 B2 | 2/2014 | Olson et al. | |
| 9,317,286 B2 | 4/2016 | Olson et al. | |
| 10,007,808 B2 | 6/2018 | Boivie et al. | |
| 10,454,903 B2 | 10/2019 | Neal | |
| 10,671,764 B2 | 6/2020 | Auh | |
| 2001/0018736 A1 | 8/2001 | Hashimoto | |
| 2002/0051536 A1 | 5/2002 | Shirakawa | |
| 2002/0181709 A1 | 12/2002 | Sorimachi | |
| 2004/0143748 A1 | 7/2004 | Yamaguchi | |
| 2004/0146158 A1 | 7/2004 | Park | |
| 2013/0275766 A1 | 10/2013 | Plainecassagne | |
| 2019/0132120 A1 * | 5/2019 | Zhang | H04L 9/16 |
| 2019/0325147 A1 * | 10/2019 | Lu | H04L 9/0897 |
| 2020/0125501 A1 * | 4/2020 | Durham | H04L 9/0861 |
| 2020/0125769 A1 | 4/2020 | Kounavis | |
| 2021/0042114 A1 | 2/2021 | Mansell | |
| 2021/0150069 A1 * | 5/2021 | Elenes | G06F 21/602 |
| 2021/0218547 A1 * | 7/2021 | Weiler | G06F 9/5016 |

OTHER PUBLICATIONS

Wikipedia, "Classic RISC pipeline", From Wikipedia, the free encyclopedia, last edited on Mar. 17, 2021, printed May 4, 2021, 7 pages, <https://en.wikipedia.org/wiki/Classic_RISC_pipeline>.

Suh et al., "Secure Program Execution via Dynamic Information Flow Tracking", ASPLOS XI: Proceedings of the 11th International conference on Architectural support for programming languages and operating systems, Oct. 9-13, 2004, 12 pages.

Oracle, "The Fully Encrypted Data Center", Encrypting Your Data Center on Oracle's SPARC Servers, Oracle Technical White Paper, Jun. 2016, 22 pages.

Whitworth, M., "Data at Rest Encryption and Key Management in GDPR", IDC Analyze the Future, Jun. 2018, 7 pages.

Smith et al., "How Practical is Computable Encryption", MITRE Innovation Program, 2013, 61 pages.

Anonymous, "Method of Shared Lock with Combined Password and Encryption", An IP.com Prior Art Database Technical Disclosure, IP.com No. IPCOM000251450D, IP.com Electronic Publication Date: Nov. 2, 2017, 5 pages.

Anonymous, "Application Protection Inside an Untrusted OS", An IP.com Prior Art Database Technical Disclosure, Original Publication Date: Feb. 9, 2010, IP.com No. IPCOM000193066D, 7 pages.

Anonymous, "Autonomous Cell-Level Database Encryption and Authentication", An IP.com Prior Art Database Technical Disclosure, Original Publication Date: Jun. 6, 2007, IP.com No. IPCOM000153678D, 10 pages.

Sinharoy et al., "IBM Power8 Processor Core Microarchitecture", Ibm Journal of Research and Development, Jan. 2015, 22 pages.

Lee et al., "Inferring Fine-Grained Control Flow Inside SFX Enclaves with Branch Shadowing", Nov. 25, 2016, 19 pages.

Sloss et al., "Designing and Optimizing System Software", ARM System Deceloper's Guide, 2004, 703 pages.

Anonymous, "Power-Efficient Processing of Applications Involving Regular Access and Processing Patterns", An IP.com Prior Art Database Technical Disclosure, IP.com No. IPCOM000244280D, IP.com Electronic Publication Date: Nov. 30, 2015, 3 pages.

Anonymous, "A Method of Register Renaming for a Merged Register File Sharing Different Data Types", An IP.com Prior Art Database Technical Disclosure, Original Publication Date: Feb. 4, 2008, IP.com No. IPCOM000167251D, 4 pages.

Mell et al., "The NIST Definition of Cloud Computing", Recommendations of the National Institute of Standards and Technology, Sep. 2011, 7 pages.

Tseng et al., "Encrypted Data Processing Design Including Cleartext Register Files", U.S. Appl. No. 17/356,784, filed Jun. 24, 2021.

IBM, List of IBM Patents or Patent Applications Treated as Related, Jun. 22, 2021, 2 pages.

"Notification of Transmittal of The International Search Report and The Written Opinion of The International Searching Authority, or The Declaration", Patent Cooperation Treaty, Applicant's or agent's file reference: F22W2139, International application No. PCT/CN2022/095159, International filing date: May 26, 2022, dated Jul. 27, 2022, 10 pgs.

* cited by examiner

ENCRYPTED DATA PROCESSING DESIGN INCLUDING LOCAL BUFFERS

BACKGROUND

The present disclosure relates generally to the field of computing, and in particular, to encrypted data processing (EDAP).

To protect data within processors, an encrypted data processing (EDAP) design ensures data is encrypted throughout a processing pipeline of the system. Only authorized applications can access cleartext data. Other software (including system software) executing on processors implementing EDAP designs are not able to access any cleartext data. The data is decrypted when it enters functional units for execution and the computation result is re-encrypted before being written back to the register file.

SUMMARY

Embodiments of the present disclosure include a method for encrypted data processing. Ciphertext data within a register file can be accessed. A local buffer within a functional unit can be accessed to attempt to locate cleartext data corresponding to the ciphertext data within the register file. In response to not locating the cleartext data within the local buffer, the ciphertext data can be decrypted to receive cleartext data using an encryption key and the cleartext data can be stored in the local buffer. The cleartext data from the local buffer can then be processed by the functional unit to receive cleartext computation results. The cleartext computation results can be encrypted within the functional unit to receive ciphertext computation results. The cleartext computation results can be stored to the local buffer and the ciphertext computation results can then be stored back to the register file.

Embodiments of the present disclosure further include a processor for encrypted data processing. The processor can include a register file configured to store ciphertext data. The processor can further include an instruction fetch and decode unit configured to fetch and decode instructions. The processor can further include a functional unit configured to process the stored ciphertext data. The functional unit of the processor can include a decryption module configured to decrypt ciphertext data from the register file to receive cleartext data using an encryption key stored within the functional unit. The functional unit of the processor can further include a local buffer configured to store the cleartext data. The functional unit of the processor can further include an arithmetic logical unit configured to generate cleartext computation results using the cleartext data. The functional unit of the processor can further include an encryption module configured to encrypt the cleartext computation results to generate ciphertext computation results for storage back into the register file.

Embodiments of the present disclosure further include a processor for encrypted data processing. The processor can include a plurality of functional units, each functional unit having a burnt-in private key and a writeable encryption key store. Each functional unit can be configured to receive an encryption key which is encrypted by a public key corresponding to the burnt-in private key. Each functional unit can be configured to decrypt the encrypted encryption key using the burnt-in private key. Each functional unit can be configured to store the encryption key to the writeable encryption key store.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
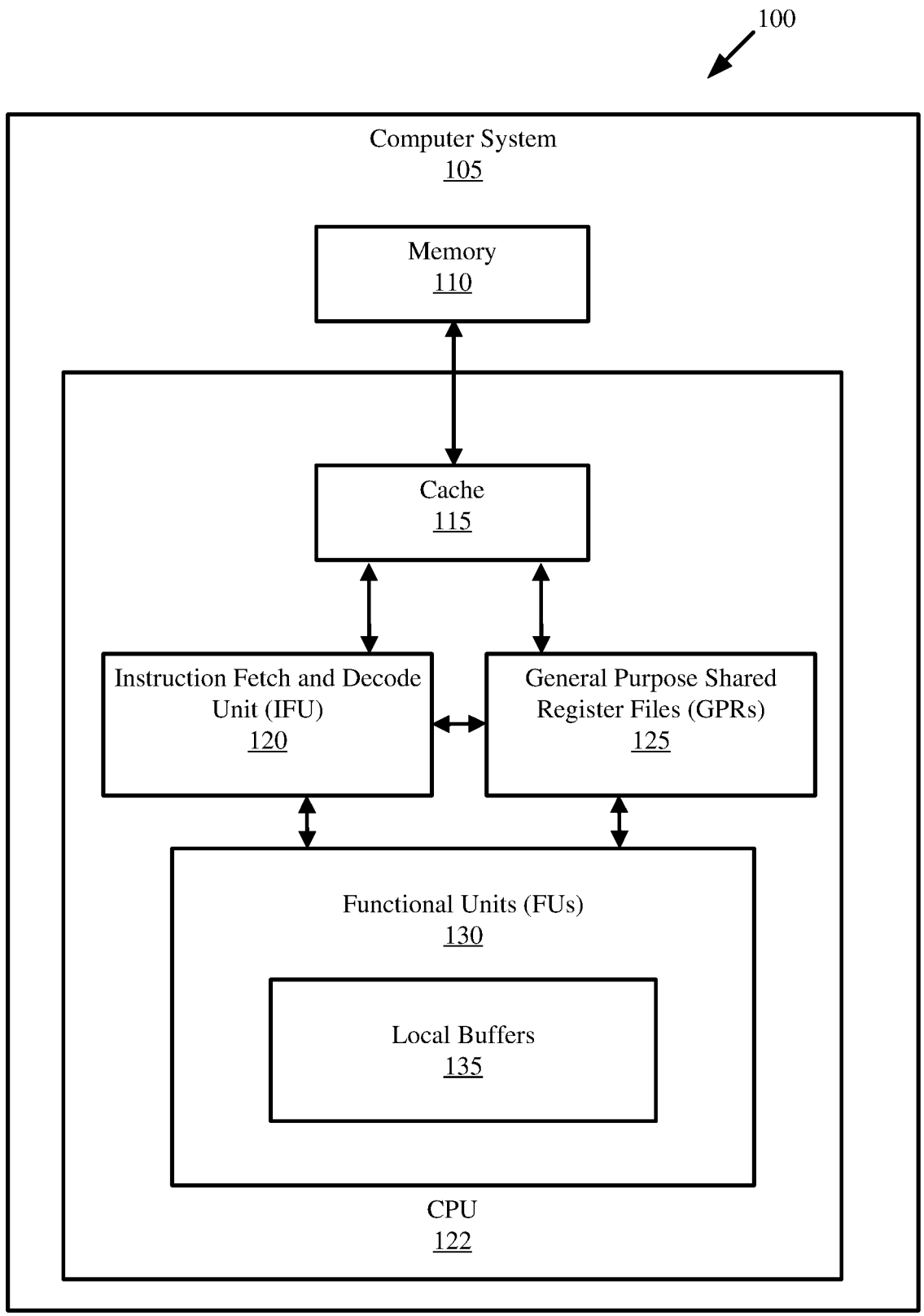
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to encrypted data processing (EDAP). While the present disclosure is not necessarily limited to such applications, various aspects of the disclosure can be appreciated through a discussion of various examples using this context.

To protect data within processors, an encrypted data processing (EDAP) design ensures data is encrypted throughout a memory hierarchy of the system, including the register files and the L1 (level 1) cache in the processor core. Unauthorized software executing on processors implementing EDAP designs are not able to access any cleartext data. The data is decrypted when it enters functional units for execution and the computation result is re-encrypted before being written back to the register file. However, decrypting and encrypting data of each instruction adds to the latency of instruction execution and can significantly slow down overall performance of the system. There is a need to maintain security within an EDAP design while improving performance of the underlying computer system.

Aspects of the present disclosure relate to a method for encrypted data processing. Ciphertext data within a register file can be accessed. A local buffer within a functional unit can be accessed to attempt to locate cleartext data corresponding to the ciphertext data within the register file. In response to not locating the cleartext data within the local buffer, the ciphertext data can be decrypted to receive cleartext data using an encryption key and the cleartext data can be stored in the local buffer. The cleartext data from the local buffer can then be processed by the functional unit to receive cleartext computation results. The cleartext computation results can be encrypted within the functional unit to receive ciphertext computation results. The cleartext computation results can be stored to the local buffer for future reuse and the ciphertext computation results can then be stored back to the register file.

Aspects of the present disclosure further include a processor for encrypted data processing. The processor can include a register file configured to store ciphertext data. The processor can further include an instruction fetch and decode unit configured to fetch and decode instructions. The processor can further include a functional unit configured to process the stored ciphertext data. The functional unit of the processor can include a decryption module configured to decrypt ciphertext data from the register file to receive cleartext data using an encryption key stored within the functional unit. The functional unit of the processor can further include a local buffer configured to store the cleartext data. The functional unit of the processor can further include an arithmetic logical unit configured to generate cleartext computation results using the cleartext data. The functional unit of the processor can further include an encryption module configured to encrypt the cleartext computation results to generate ciphertext computation results for storage back into the register file.

In embodiments, the processor can include a plurality of functional units, each functional unit having a burnt-in private key and a writeable encryption key store. Each functional unit can be configured to receive an encryption key which is encrypted by a public key corresponding to the burnt-in private key. Each functional unit can be configured to decrypt the encrypted encryption key using the burnt-in private key. Each functional unit can be configured to store the encryption key to a writeable encryption key store.

Turning now to the figures, FIG. 1 is a block diagram illustrating an example computing environment 100 in which illustrative embodiments of the present disclosure can be implemented. The computing environment 100 includes a computer system 105. The computer system 105 includes memory 110 and a central processing unit (CPU) 122. The CPU 122 includes a cache 115, an instruction fetch and decode unit (IFU) 120, general purpose shared register files (GPRs) 125, and functional units (FUs) 130.

Figure 2:
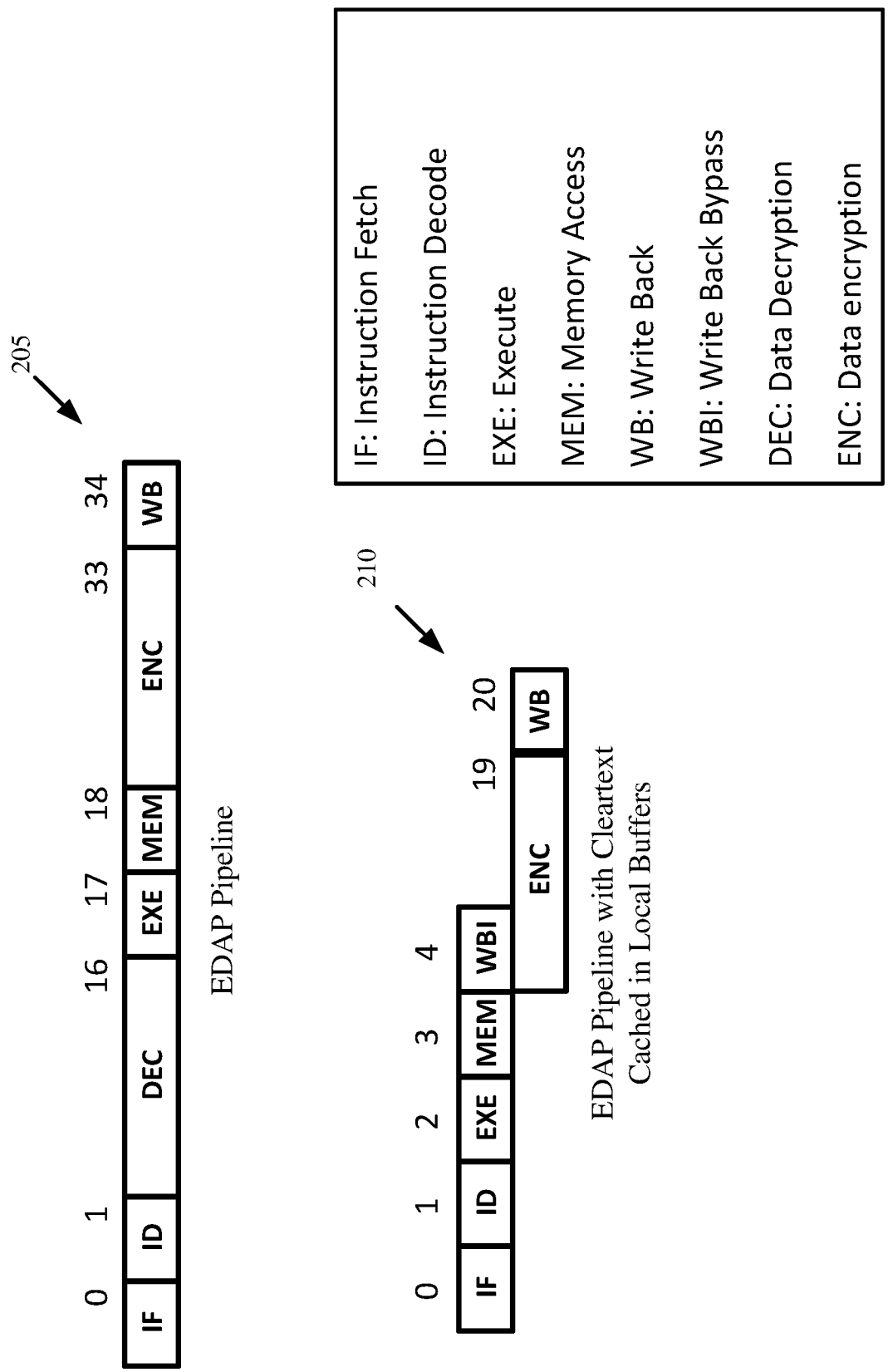
FIG. 2 is a diagram illustrating instruction pipelines for data processing, in accordance with embodiments of the present disclosure.

The computer system 105 can be configured to execute instructions issued by software. In particular, the CPU 122 can be configured to fetch instructions (e.g., from cache 115 by the IFU 120), decode instructions (e.g., by the IFU 120), execute instructions (e.g., using functional units 130), access memory, and writeback computations to GPRs 125 (a collection of register files). In embodiments, the CPU 122 can be configured in an EDAP design, such that the data may be protected prior to the execution stage (e.g., data is encrypted and not accessible to software). Thus, data can be decrypted prior to execution, and re-encrypted such that encrypted data is stored back into the register files during writeback. However, encrypting and decrypting data for each instruction can add cycle time and negatively impact performance of the computer system 105. For example, decryption and encryption stages of processing data can each take approximately 15 processor cycles. EDAP pipeline 205 of FIG. 2 depicts an EDAP processing pipeline. "DEC" and "ENC" depict data decryption (e.g., from ciphertext to cleartext) and data encryption (e.g., from cleartext to ciphertext) stages within the pipeline.

As such, aspects of the present disclosure decouple the traditional EDAP processing pipeline by enabling storage of cleartext data (e.g., decrypted data) within local buffers 135 of functional units 130. By storing cleartext data within local buffers 135 accessible only to functional units 130, processing time associated with decrypting and encrypting data each time the cleartext data within the local buffers 135 is needed can be eliminated. For example, if a local buffer 135 stores cleartext data, decrypted for use as an input by an instruction or produced as a result by an instruction, which is required as an input by a subsequent instruction (e.g., based on an address of a register), latency associated with processing the data is reduced as decryption of the data is not necessary (as it is already present in cleartext within local buffers 135). Further, upon computation of results by functional units 130, the results can be written back to the local buffers 135 without having to encrypt the data. Upon writing back the data to register files, encryption of the data is completed. As such, significant energy and time savings can be achieved (e.g., 30 cycles or more can be saved from bypassing decryption and encryption). In this example, security can be maintained as the cleartext data is only accessible to functional units 130 required to execute the instruction and the cleartext data is encrypted before being transmitted back to GPRs 125. Further, the access to the cleartext data can be restricted to the instructions of a designated hardware thread (e.g., user program instructions) in its non-privileged state, precluding the hypervisor, O/S, libraries, and the rest of software stack from accessing the designated hardware thread's cleartext data.

However, in conventional EDAP processing, the functional units 130 would be required to decrypt data retrieved from GPRs 125 and thereafter re-encrypt the data after results of computations are produced. This increases the amount of processing time and energy used to execute the instructions. Therefore, there are significant advantages to storing cleartext data within local buffers 135 while maintaining data in an encrypted state within GPRs 125, cache 115, and memory 110.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, cache 115 does not necessarily have to reside within CPU 122. In some embodiments, a portion of cache 115 may be included within CPU 122 and another portion of cache 115 may be included within memory 110. As another example, a plurality of homogenous or heterogenous functional units 130 (not shown), each with its dedicated local buffer 135, may be sharing a single IFU 120. Similarly, a plurality of homogenous or heterogenous functional units 130, each with its dedicated local buffer 135, may be sharing a single register file 125.

Referring to FIG. 2, a new pipeline 210 for data based on cleartext data being stored in local buffers 135 of functional units 130 is introduced, in accordance with embodiments of the present disclosure. As discussed above, EDAP Pipeline 205 depicts conventional EDAP processing steps required to execute an instruction. In EDAP Pipeline 205, because data stored in GPRs 125 is always encrypted, any time registers are accessed for processing, decryption is required to be performed prior to execution and results of execution are required to be re-encrypted before being written back to registers.

In accordance with aspects of the present disclosure implementing local buffers 135 storing cleartext, decryption of data can be bypassed within pipeline 210. This is because the data stored within local buffers 135 is already in cleartext and any time an instruction accesses a local buffer 135 storing cleartext (e.g., an authorized software application having an encryption key permitting access to the local buffer 135), the decryption step can be skipped. Prior to writeback to GPRs 125, the data is encrypted. However, in some embodiments, results from computations can be stored back in cleartext to local buffers 135 for reuse in further processing (allowing bypass of encryption cycles for computations made within functional units).

Figure 3:
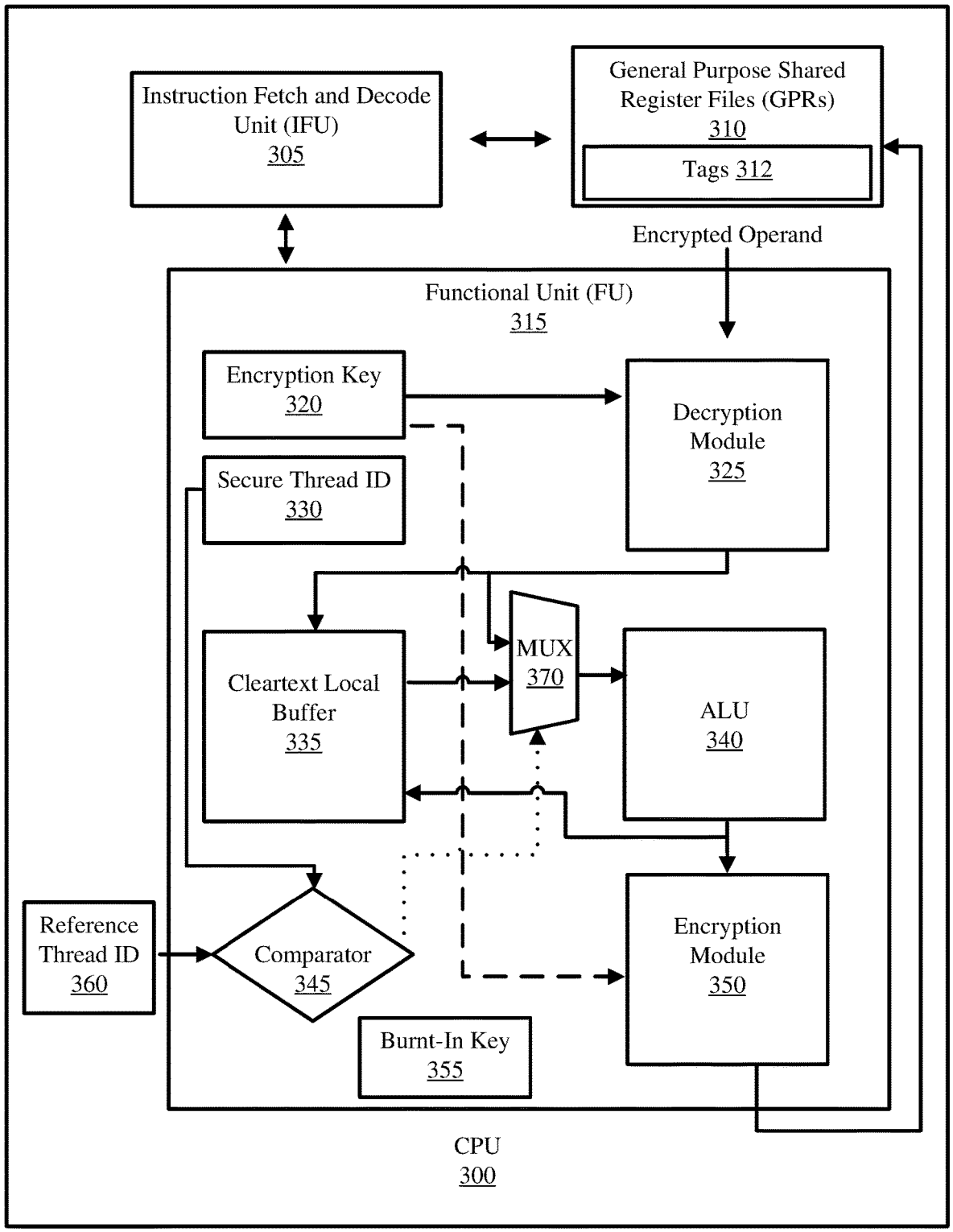
FIG. 3 is a block diagram illustrating an example processor having a cleartext local buffer, in accordance with embodiments of the present disclosure.

Referring now to FIG. 3, shown is an example CPU 300 implementing a cleartext local buffer 335, in accordance with embodiments of the present disclosure. The CPU 300 includes an instruction fetch and decode unit (IFU) 305, general purposed shared register files (GPRs) 310, and a functional unit (FU) 315.

Reference will now be made to various entities which may be involved in encrypted data processing (EDAP) of sensitive data. Within a computer network environment (e.g., a cloud computing environment, such as in FIG. 5) implementing EDAP, a platform provider (PP) may provide virtual machines or other cloud infrastructure (e.g., CPU 122 and CPU 300) for computations. An application author (AA) can provide applications or libraries that will run on the platform (e.g., CPU 122 and CPU 300) provided by the PP. A data owner (DO) may provide data for computation. The DO may opt to keep their data protected by encryption (e.g., a DO encryption key). The DO may desire to keep their cleartext data accessible only to an authorized application associated with the AA running on a designated CPU 300 provisioned by the PP.

As such, the DO may encrypt their data with an encryption key 320 (e.g., a symmetric key). The PP may support tags 312 for data indicating whether data is encrypted (e.g., protection tags). These tags 312 can be propagated throughout the memory hierarchy (e.g., between memory 110, cache 115, and GPRs 125). As such, if a protection tag 312 is indicated as associated with any data provided by the DO, then the data will be protected by EDAP (e.g., maintained in an encrypted state unless accessed by an authorized application, preventing other components such as a supervisor, hypervisor, or operating system (O/S) from access in a privileged state). In embodiments, the encryption key 320 provided by the DO can be encrypted by a public key (e.g., corresponding to burnt-in key 355) associated with CPU 300. Thereafter, the encryption key 320 can be decrypted and installed (e.g., in a writeable encryption key datastore) using a burnt-in key 355 (e.g., a private key) associated with CPU 300.

The AA may sign a hash of their program using a cryptographic hash function. Upon receiving work from the DO, the PP may generate a secure thread ID identification/identifier (ID) 330 (e.g., a session ID) by encrypting the hash provided by the AA with the encryption key 320 provided by the DO (however, the PP may not have read access to the secure thread ID 330 or the encryption key 320 within the FU 315). As such, the PP may authorize the AA's program by encrypting its hash with the DO's encryption key 320. The PP can then store the secure thread ID 330 with the encryption key 320 within functional unit 315 (e.g., prior to execution). (Note: The encryption key 320 is generated by the DO and transmitted to the PP after encryption by the public key corresponding to the burnt-in key 355 within the functional unit 315). The PP may only manipulate encryption key 320 while encrypted with CPU 300's public key. This may hide the encryption key 320 from the PP, but make it accessible to the FU 315 such that data associated with the DO can be decrypted and encrypted within the confines of the FU 315.

Upon launching an application associated with an AA, the PP can decrypt data owned by the DO using the encryption key 320. The PP can then independently generate a reference thread ID 360 (e.g., during execution time) corresponding to the processing thread associated with the data owned by the DO. The reference thread ID 360 can be generated by encrypting the signed hash provided by the AA with the encryption key 320 provided by the DO (accessible to the PP via burnt-in key 355). This can be used for comparison to the secure thread ID 330 (e.g., stored in a writeable secure thread ID datastore) to ensure only the authorized applications associated with the AA can access cleartext data stored within cleartext local buffers 335 during execution.

Upon execution, the IFU 305 can send control signals to the functional unit 315 specifying operations (e.g., decoded opcode) to be performed (e.g., by arithmetic logic unit (ALU) 340)) along with operands retrieved from the GPRs 310. These operands can each be associated with tags 312 (e.g., bits indicating whether the operands are in ciphertext or plaintext). For any encrypted operands having protection tags indicating the data is in ciphertext, the operands can be decrypted using a decryption module 325 having access to the DO's encryption key 320. The cleartext data retrieved after decryption can then be used in an ALU 340 operation, and additionally stored within the cleartext local buffer 335. In embodiments, the cleartext local buffer 335 includes physical register numbers such that the cleartext data stored within the cleartext local buffer 335 can be content addressable. In embodiments, the cleartext local buffer 335 only stores cleartext data which had tags 312 indicating the corresponding data was encrypted within GPRs 310. Thereafter, the reference thread ID 360 provided by, for example, the PP, can be received such that the thread can be authorized for computation by the ALU 340 with access to the cleartext local buffer 335.

In embodiments, prior to processing the encrypted operand, the cleartext local buffer 335 can be checked to attempt to locate cleartext data corresponding to ciphertext data within the GRPs 310 (e.g., via physical register numbers). If a determination is made that the cleartext local buffer 335 already includes cleartext data which is required to be accessed, then decryption of the encrypted operand may not occur. Rather, the cleartext data in the cleartext local buffer 335 can be used instead (e.g., selected by MUX 370) and decryption can be bypassed.

At execution, the secure thread ID 330 received from the DO can be compared to the reference thread ID 360 provided by the PP by a comparator 345. If a determination is made by the comparator 345 that the secure thread ID 330 and reference thread ID 360 match, then a determination is made that the cleartext stored within the cleartext local buffer 335 is secure and not accessible by any other components (e.g., threads issued by hypervisors, supervisors, or operating systems). Thus, if a match is determined by the comparator 345, then the secure thread ID 330 is verified and the cleartext local buffer data can be processed by ALU 340. Upon processing cleartext data within the functional unit 315, the result produced by the ALU can be encrypted by an encryption module 350 using the encryption key 320. The encrypted data (e.g., encrypted computation results) can then be transmitted back to GPRs 310, and its corresponding cleartext can be stored back in the cleartext local buffer 335.

In embodiments, if there is no match between the secure thread ID 330 and the reference thread ID 360, or if there is a context switch, then the encryption key 320 and secure thread ID 330 can be cleared such that encrypted operands cannot be decrypted and stored within cleartext local buffer 335. A context switch is a process in which the state of a processor can be stored such that another task can be completed, and thereafter, the state of the process can be restored such that processing can resume. Context switching is a feature of multitasking operating systems allowing a single process to be shared by multiple processes. Because a context switch can indicate that another thread may be utilizing FU 315, then cleartext data within cleartext local buffer 335, the secure thread ID 330, and the encryption key 320, can be cleared upon context switch to prevent other components from accessing the sensitive data.

Ultimately, a determination can be made whether ciphertext data required to be processed from the GPRs 310 is already included in the cleartext local buffer 335. If the data is already included as cleartext within the cleartext local buffer 335 (e.g., a hit occurs), then multiplexer (MUX) 370 selects data from the cleartext local buffer 335. Otherwise, the MUX 370 selects the data which was decrypted by the decryption module 325. Similarly, the MUX 370 can receive a signal from the comparator 345 to determine whether the secure thread ID 330 is verified based on a comparison to the reference thread ID 360. If the secure thread ID 330 is verified, then the MUX 370 permits processing of the data within ALU 340. Otherwise, the MUX 370 can transmit a signal preventing processing of data within the ALU 340.

In embodiments, the cleartext local buffer 335 can be fully mapped to GPRs 310. In some embodiments, the cleartext local buffers 335 can be mapped to GPRs 310 via indexed lookup tables.

As previously discussed, each register entry within GPRs 310 can include tags 312 (e.g., a designated bit placeholder) indicating whether the data is in cleartext or ciphertext. Thus, the IFU 305 can be configured to read each register entry to determine whether data is encrypted or not, and only data which requires decryption may be decrypted by the decryption module 325 and stored within cleartext local buffer 335. For example, metadata within registers may not be encrypted and may not require decryption and storage within cleartext local buffer 335. In embodiments, tags 312 are only accessible to authorized software (e.g., software authorized by a DO). In embodiments, tags 312 for incoming data can be used to determine whether the data leaving the functional unit 315 requires encryption. For example, if data from two register entries of GPRs 310 are both indicated as encrypted, results received from computing the data from the two register entries may require encryption prior to writeback to GPRs 310.

In embodiments, CPU 300 may include a plurality of functional units (not shown), each functional unit having a cleartext local buffer (not shown). In these embodiments, a snoop bus (not shown) can be configured to maintain coherency across all cleartext local buffers. That is, data replicated across all cleartext local buffers can be checked to determine whether it is consistent with ciphertext within GPRs 310 (e.g., if cleartext local buffers 335 are mapped to GPRs 310). If the data within cleartext local buffers 335 is inconsistent with data stored within GPRs 310, then the snoop bus can be configured to erase the values from the cleartext local buffers 335 that are inconsistent with the GPRs 310. As such, a coherency protocol can be maintained to ensure consistency between each cleartext local buffer and corresponding mapped GPRs 310.

In embodiments, if multiple DO's require protection by the CPU 300, then tags 312 associated with each piece of data can further indicate the owner of the data. For example, the tags 312 can indicate an owner of the data in addition to whether the data is in cleartext or ciphertext. As such, there may be a designated bit (or multiple bits) placeholder within tags 312 indicating a data owner and a second designated bit placeholder within tags 312 indicating whether or not the data is encrypted. To accommodate multiple data owners, a key index can be maintained to store (e.g., within cleartext local buffer 335) each encryption key associated with each data owner. The IFU 305 can check each piece of data entering the functional unit 315 to determine a data owner and use a corresponding key associated with the data owner to decrypt the data for storage in the cleartext local buffer 335. In these embodiments, because the secure thread ID 330 is based on the encrypted representation of the hash signed by the AA, a key leader can be designated to generate a lead thread ID. Thereafter, data can be authorized to be computed by ALU 340 by comparing the reference thread ID (e.g., generated by the PP by encrypting the hash signed by the AA with lead encryption key) and the secure thread ID 330 (e.g., generated by encrypting the hash signed by the AA with the lead encryption key). Data computed by the ALU 340 can then be re-encrypted for writeback to GPRs 310 based on the encryption key associated with the data owner.

In embodiments, if there are multiple programs authorized to access cleartext data (e.g., associated with respective AAs), then the cleartext local buffer can store entries for each program having a unique thread ID. As such, entries within the cleartext local buffer can be associated with respective thread IDs based on the AA of the program. In these embodiments, to authorize data to be processed by ALU 340, each respective thread ID can be compared to a reference thread ID to ensure the application is authorized to access the cleartext data.

It is noted that FIG. 3 is intended to depict the representative major components of an example CPU 300. In some embodiments, however, individual components can have greater or lesser complexity than as represented in FIG. 3, components other than or in addition to those shown in FIG. 3 can be present, and the number, type, and configuration of such components can vary. For example, the CPU 300 may include a plurality of additional functional units 315, each functional unit having a respective cleartext local buffer 335.

Further, while reference is made to various entities (e.g., data owners, application authors, and platform providers) that may be securely associated (e.g., securely linked) with components such as encryption key 320, secure thread ID 330, and reference thread ID 360 illustrated in FIG. 3, the above-referenced security associations are merely exemplary. Any suitable entity can be securely linked to any suitable component shown in FIG. 3 (e.g., encryption key 320 may be associated with an application author or platform provider, rather than a data owner, for example). Further, secure associations can exist between entities and components not shown in FIG. 3 without departing from the spirit and scope of the present disclosure.

Figure 4:
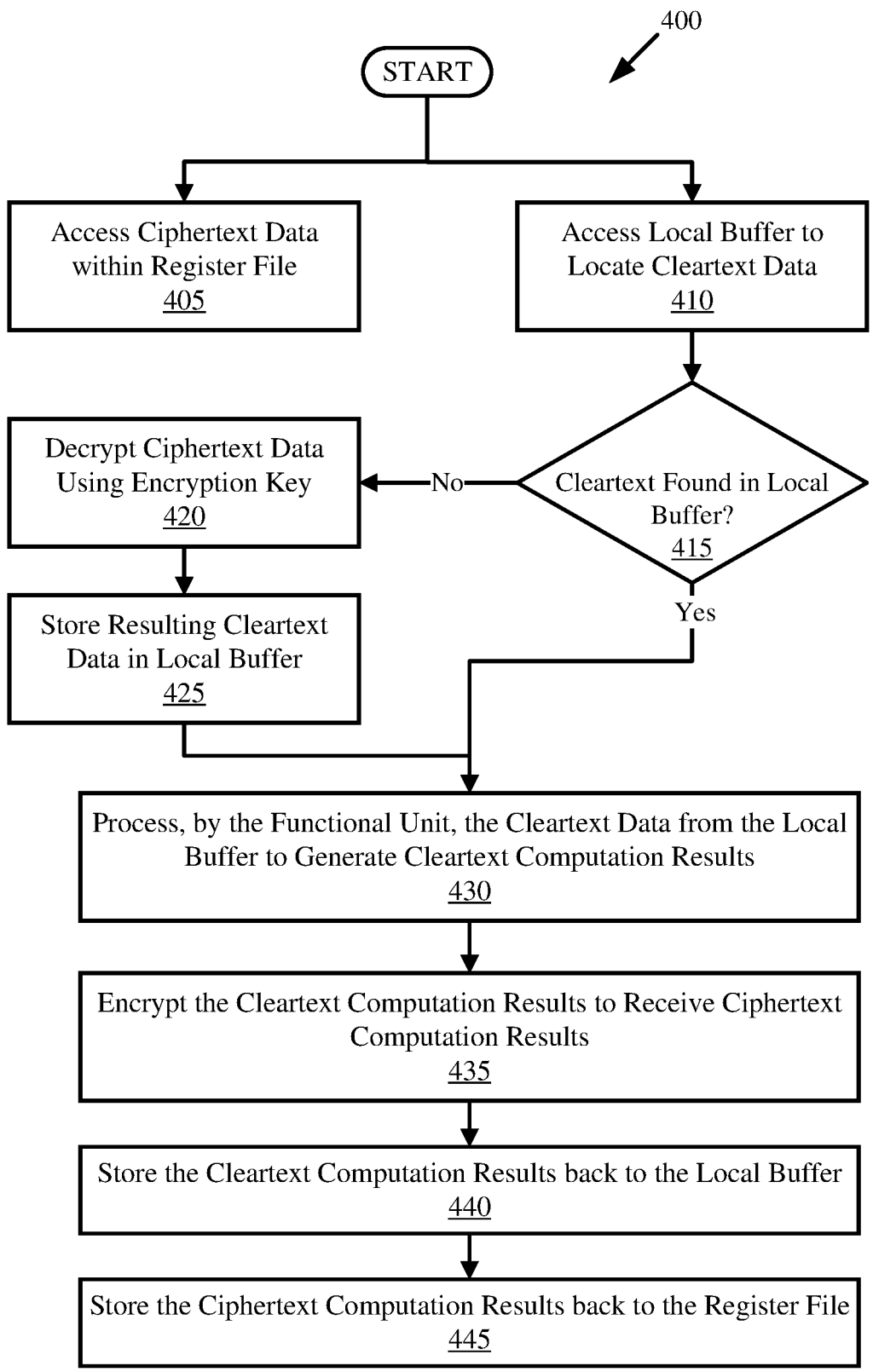
FIG. 4 is a flow-diagram illustrating an example method for processing data within a local buffer of a functional unit, in accordance with embodiments of the present disclosure.

Referring now to FIG. 4, shown is a flow-diagram illustrating an example method 400 for processing data within a local buffer of a functional unit, in accordance with embodiments of the present disclosure.

Method 400 initiates at operations 405 and 410, where ciphertext data within a register file is accessed (e.g., by an instruction fetch and decode unit) at operation 405, and a cleartext local buffer is concurrently searched for the corresponding cleartext (e.g., corresponding to the ciphertext within the register file) at operation 410. A determination is made whether the corresponding cleartext is found in the local buffer. This is illustrated at operation 415.

If the corresponding cleartext data is not found in the local buffer, then the ciphertext data accessed within the register file at operation 405 is decrypted (e.g., using an encryption key) to receive cleartext data. This is illustrated at operation 420. The resulting cleartext data is then stored in the local buffer. This is illustrated at operation 425.

If a determination is made that the corresponding cleartext is found in the local buffer at operation 415, or after operation 425 (e.g., if cleartext is not found in the local buffer and decryption occurs at operation 420 following storage of the cleartext into the local buffer at operation 425) is complete, the cleartext data from the local buffer is then processed by the functional unit to generate cleartext computation results. This is illustrated at operation 430.

The cleartext computation results are then encrypted to receive ciphertext computation results. This is illustrated at operation 435. The cleartext computation results are then stored back to the local buffer. This is illustrated at operation 440. The ciphertext computation results are then stored back to the register file. This is illustrated at operation 445.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
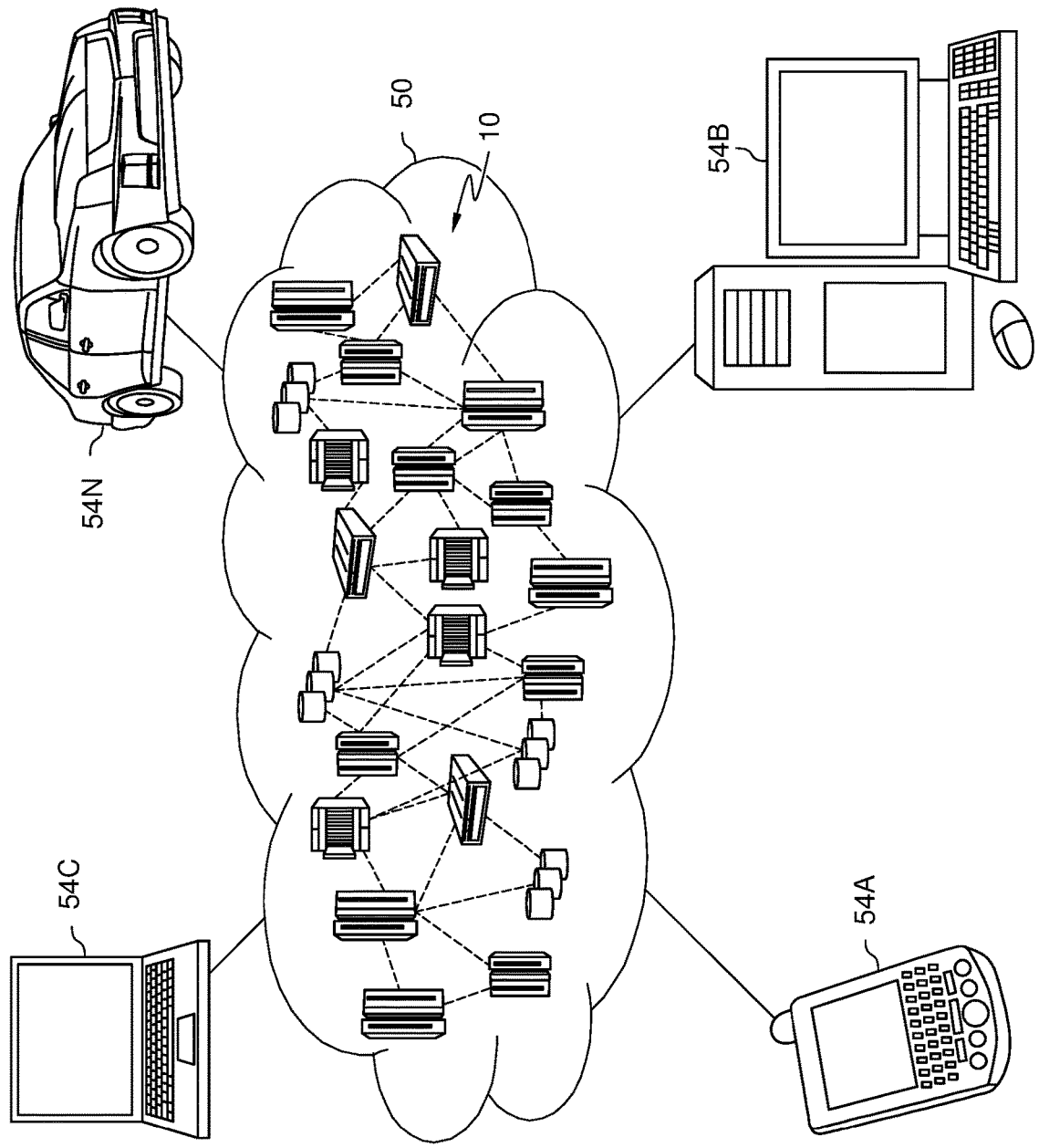
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
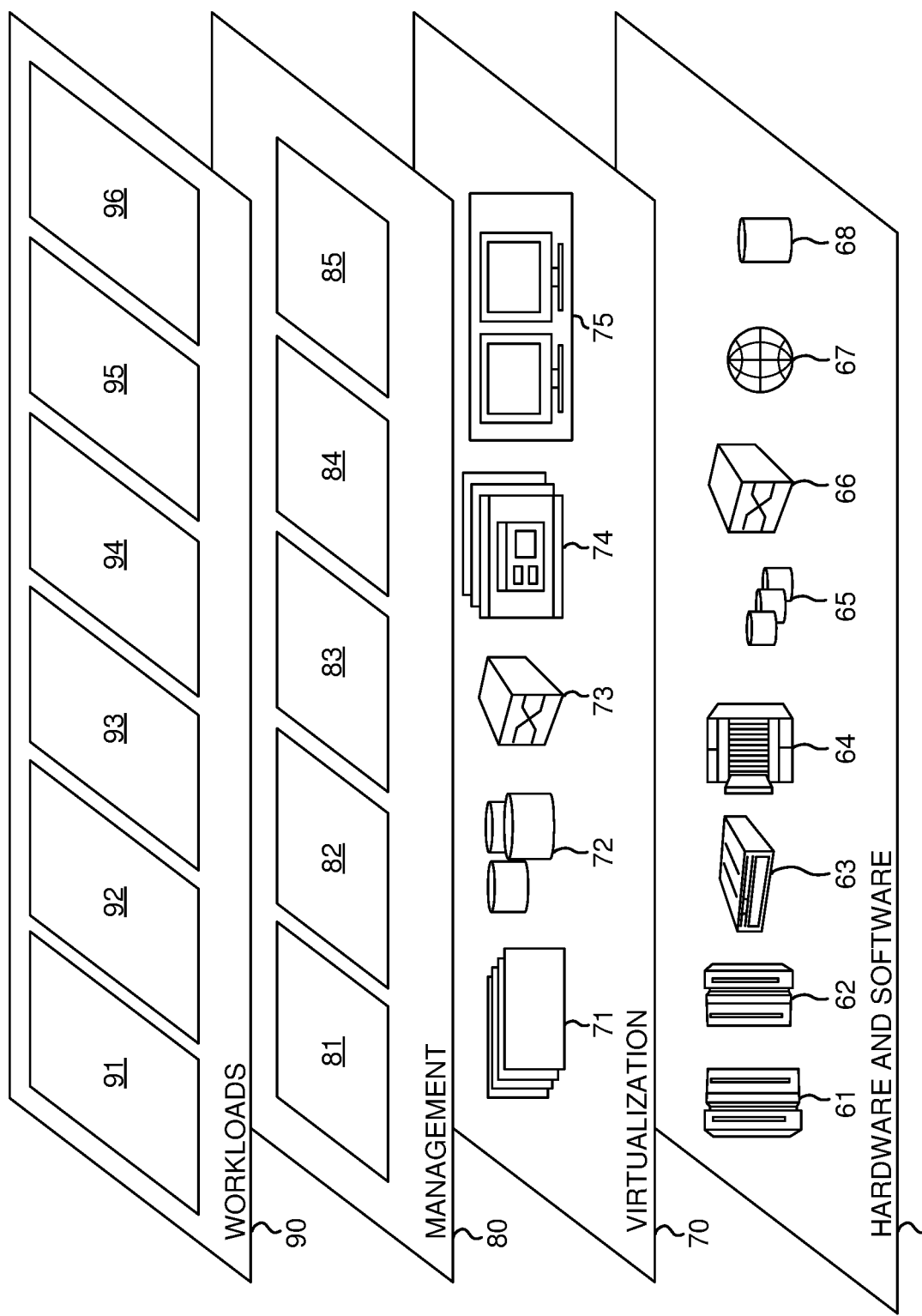
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encrypted data processing 96.

Figure 7:
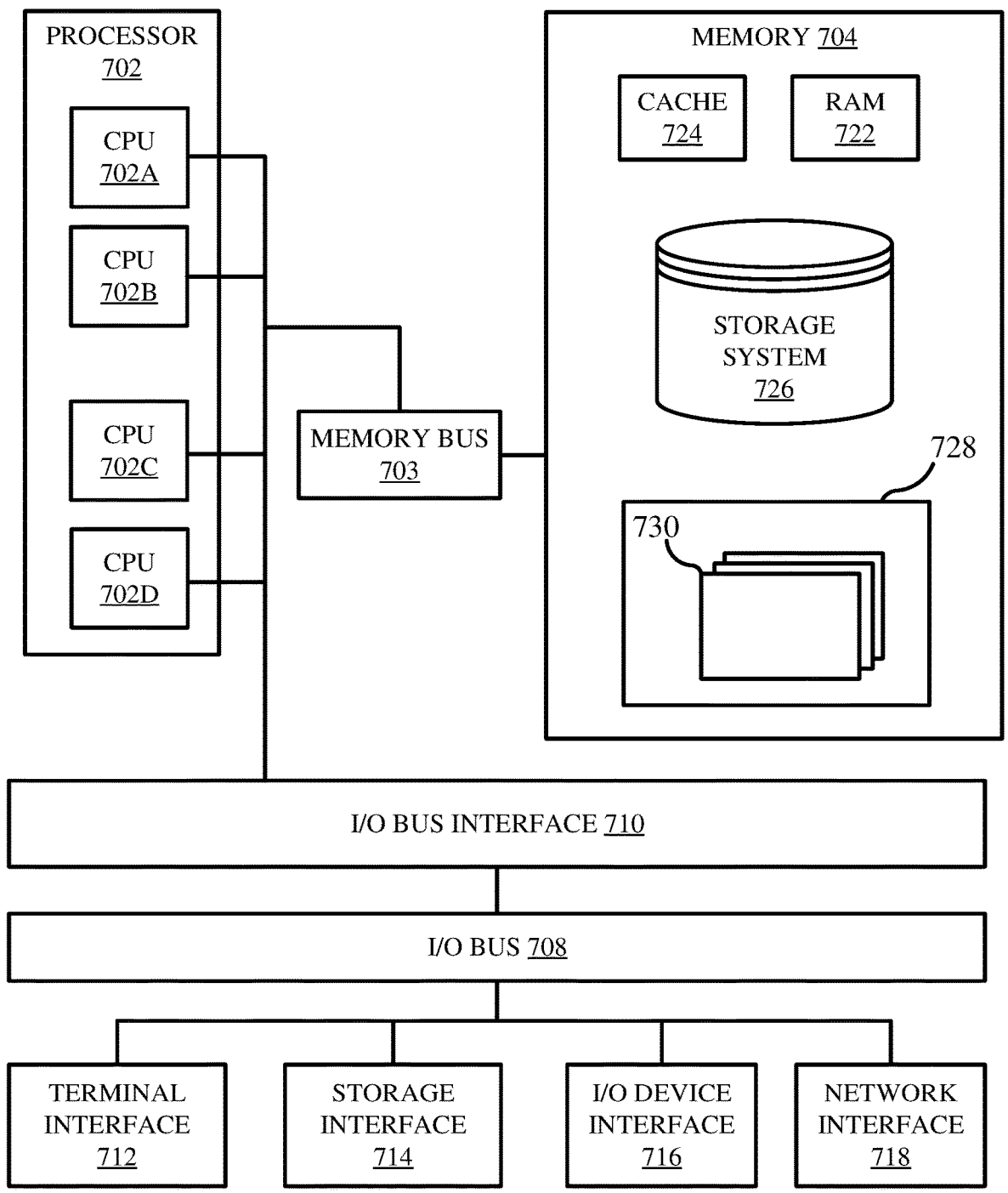
FIG. 7 is a high-level block diagram illustrating an example computer system that may be used in implementing one or more of the methods, tools, and modules, and any related functions, described herein, in accordance with embodiments of the present disclosure.

Referring now to FIG. 7, shown is a high-level block diagram of an example computer system 701 (e.g., computer system 105) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702 (e.g., CPUs 122 and 300), a memory subsystem 704 (e.g., memory 110 and cache 115), a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache (e.g., cache 115).

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
accessing ciphertext data within a register file;
accessing a local buffer within a functional unit to attempt to locate cleartext data corresponding to the ciphertext data within the register file;
decrypting, in response to not locating the cleartext data within the local buffer, the ciphertext data to receive the cleartext data using an encryption key and storing the cleartext data in the local buffer, wherein in response to locating the cleartext data within the local buffer, bypassing the decrypting;
processing, by the functional unit, the cleartext data from the local buffer to receive cleartext computation results;
encrypting the cleartext computation results to receive ciphertext computation results within the functional unit; and
storing the cleartext computation results in the local buffer and the ciphertext computation results back to the register file.

2. The method of claim 1, wherein a tag within each register entry of the register file indicates whether data is in ciphertext or plaintext.

3. The method of claim 2, wherein only data from register entries having the tag indicating that the data is in ciphertext within the register file are decrypted and stored within the local buffer of the functional unit and wherein only data from register entries having the tag indicating that the data is in ciphertext within the register file are encrypted and stored back to the register file.

4. The method of claim 1, wherein prior to processing by the functional unit, a reference thread identification (ID) provided by a processor is matched with a stored secure thread ID within the functional unit.

5. The method of claim 4, wherein the stored secure thread ID and reference thread ID are linked to the encryption key of a data owner and a hash of a program being executed by a hardware thread signed by an application author.

6. The method of claim 4, wherein the processing is not performed when the reference thread ID and the stored secure thread ID do not match.

7. The method of claim 1, wherein a coherency protocol is configured to maintain consistency between data of the local buffer of the functional unit and data of the register file.

8. The method of claim 7, wherein the coherency protocol further maintains consistency between a plurality of additional local buffers of respective functional units and data of the register file.

9. A processor comprising:
a register file configured to store ciphertext data;
an instruction fetch and decode unit configured to fetch and decode instructions; and
a functional unit configured to process the stored ciphertext data, wherein the functional unit further includes:
a decryption module configured to decrypt ciphertext data from the register file to receive cleartext data using an encryption key stored within the functional unit;
a local buffer configured to store the cleartext data, wherein the decryption module does not decrypt the ciphertext data into the cleartext data when a determination is made that the cleartext data is already located in the local buffer;
an arithmetic logical unit configured to generate cleartext computation results using the cleartext data; and
an encryption module configured to encrypt the cleartext computation results to generate ciphertext computation results for storage back into the register file.

10. The processor of claim 9, wherein a tag within each register entry of the register file indicates whether data is in ciphertext or plaintext.

11. The processor of claim 10, wherein only data from register entries having the tag indicating that the data is in ciphertext within the register file are decrypted by the decryption module and stored within the local buffer of the functional unit.

12. The processor of claim 9, wherein prior to processing by the functional unit, a reference thread identification (ID) provided by the processor is matched with a stored secure thread ID within the functional unit.

13. The processor of claim 12, wherein the stored secure thread ID and reference thread ID are linked to the encryption key of a data owner and a hash of a program being executed by a hardware thread signed by an application author.

14. The processor of claim 12, wherein the processing is not performed when the reference thread ID and the stored secure thread ID do not match.

15. The processor of claim 9, wherein a coherency protocol is configured to maintain consistency between data of the local buffer of the functional unit and data of the register file.

16. A processor having a plurality of functional units, each functional unit having a burnt-in private key and a writeable encryption key store, wherein each functional unit is configured to:
receive an encryption key which is encrypted by a public key corresponding to the burnt-in private key;
decrypt the encrypted encryption key using the burnt-in private key; and
store the encryption key to the writeable encryption key store, wherein the encryption key is used to decrypt data retrieved from a register file and store the decrypted data in a local buffer in each functional unit when the decrypted data is not already located in the local buffer of each functional unit.

17. The processor of claim 16, wherein each functional unit includes a writeable secure thread ID store, wherein each functional unit is further configured to:
receive a secure thread identification (ID) encrypted by the public key corresponding to the burnt-in private key;
decrypt the encrypted secure thread ID using the burnt-in private key;
store the secure thread ID to the writeable secure thread ID store.

18. The processor of claim 17, wherein the secure thread ID is derived from a cryptographic hash function of a program being executed by a hardware thread.

19. The processor of claim 16, wherein the encryption key is used to encrypt cleartext data processed from the local buffer for storage back to the register file.

* * * * *